United States Patent
Collins et al.

(10) Patent No.: US 10,947,441 B2
(45) Date of Patent: Mar. 16, 2021

(54) METHOD OF ABANDONING A ZONE OR A WELL WITH SCALE

(71) Applicant: Aubin Limited, Aberdeenshire (GB)

(72) Inventors: Patrick Joseph Collins, Aberdeenshire (GB); Lindsay Anne Wylie, Aberdeenshire (GB)

(73) Assignee: Aubin Limited, Aberdeenshire (GB)

( * ) Notice: Subject to any disclaimer, the term of this patent is extended or adjusted under 35 U.S.C. 154(b) by 0 days.

(21) Appl. No.: 16/617,112

(22) PCT Filed: Jun. 4, 2018

(86) PCT No.: PCT/GB2018/051524
§ 371 (c)(1),
(2) Date: Nov. 26, 2019

(87) PCT Pub. No.: WO2018/220408
PCT Pub. Date: Dec. 6, 2018

(65) Prior Publication Data
US 2020/0148935 A1    May 14, 2020

(30) Foreign Application Priority Data
Jun. 2, 2017   (GB) .................................... 1708827

(51) Int. Cl.
*E21B 33/138*   (2006.01)
*C09K 8/467*   (2006.01)
(Continued)

(52) U.S. Cl.
CPC ............ *C09K 8/467* (2013.01); *C04B 28/148* (2013.01); *C09K 8/426* (2013.01); *C09K 8/528* (2013.01);
(Continued)

(58) Field of Classification Search
None
See application file for complete search history.

(56) References Cited

U.S. PATENT DOCUMENTS 3,651,868 A * 3/1972 Caudle .................. C09K 8/528
166/307
4,869,621 A   9/1989 McLaren et al.
(Continued)

FOREIGN PATENT DOCUMENTS

GB        254344 A     12/1926
GB       2439076 A     12/2007
(Continued)

OTHER PUBLICATIONS

International Search Report for Application No. PCT/GB2018/051524 dated Jul. 27, 2018, 4 pages.

*Primary Examiner* — Andrew Sue-Ako
(74) *Attorney, Agent, or Firm* — Howard & Howard Attorneys PLLC

(57) ABSTRACT

The method includes a step of introducing into the reservoir, via a well, a mixture comprising a scale inhibitor, a first scale precursor and a second scale precursor. The first and second scale precursors can react together to form scale. The first scale precursor may be an ammonium salt. The method can further comprise a step of stopping the introduction into the reservoir of the mixture and shutting in the well for 2-24 hours, and a step of introducing into the reservoir a further mixture comprising a scale inhibitor, a first and second scale precursor which can react together to form scale. The steps of stopping and resuming the introduction of mixtures may be repeated at least once. The components of the mixtures may be provided as concentrated solutions and diluted in a stream of water prior to being introduced into the reservoir. The method provides an effective way of generating a barrier (Continued)

to fluid flow in a reservoir. The method may be a method of abandoning an entire well in a reservoir.

20 Claims, 6 Drawing Sheets

(51) Int. Cl.
*C04B 28/14* (2006.01)
*C09K 8/42* (2006.01)
*C09K 8/528* (2006.01)
*C04B 103/22* (2006.01)

(52) U.S. Cl.
CPC ........ *E21B 33/138* (2013.01); *C04B 2103/22* (2013.01)

(56) References Cited

U.S. PATENT DOCUMENTS

| | | |
|---|---|---|
| 5,244,043 A | 9/1993 | Shuler |
| 2008/0023205 A1* | 1/2008 | Craster ............... E21B 33/1208 166/387 |
| 2008/0314591 A1 | 12/2008 | Hales et al. |
| 2009/0314493 A1 | 12/2009 | Harris et al. |
| 2020/0131887 A1* | 4/2020 | Collins ................ E21B 33/138 |

FOREIGN PATENT DOCUMENTS

| | | |
|---|---|---|
| WO | 2007091032 A1 | 8/2007 |
| WO | 2017078713 A1 | 5/2017 |

* cited by examiner

METHOD OF ABANDONING A ZONE OR A WELL WITH SCALE

CROSS-REFERENCE TO RELATED APPLICATIONS

The present application is the National Stage of International Patent Application No. PCT/GB2018/051524 filed on Jun. 4, 2018, which claims priority to and all the benefits of Patent Application No. GB 1708827.9 filed on Jun. 2, 2017, which are both hereby expressly incorporated herein by reference in their entirety.

The present invention relates to a method of abandoning a zone or a well in a reservoir.

When an oil and/or gas well has reached the end of its economic life, it needs to be made safe and abandoned such that the chance of any uncontrolled release of hydrocarbons to the environment is mitigated.

It would be best if the reservoir could be returned as close as possible to its original state. Traditionally wells have been plugged with cement. However there are concerns that cement is an insufficient barrier and that hydrocarbons may still escape to the surface through annuli and cracks behind casing, between casings and through the cement.

These annuli and cracks generally form as a result of poorly installed casing cement, poor cement bonds, or more commonly, the passage of time which with cycles of tension and compression can cause fractures and failures in the cement.

One approach suggested to address these concerns is to mill away the casing thereby exposing the reservoir and then filling the space created with cement, thereby creating an artificial cap rock. While such an approach might be effective, it is likely to be extremely expensive because it requires the use of a drilling rig.

Any material used to plug the well should last and/or be stable in-situ for many, typically thousands of years.

Zones of a reservoir can also be abandoned for the same or other reasons.

According to a first aspect of the present invention, there is provided a method of abandoning a zone in a reservoir, the method comprising the steps of:
(i) introducing into the reservoir, via a well, a mixture comprising a scale inhibitor, a first scale precursor and a second scale precursor, wherein
(ii) stopping the introduction into the reservoir of the mixture and optionally shutting in the well for 2-24 hours; and
(iii) introducing into the reservoir, via a well, a further mixture comprising a scale inhibitor, a first scale precursor and a second scale precursor, wherein the first and second scale precursors of the further mixture react together to form scale.

In the mixture and/or the further mixture, the combination of the first scale precursor and the scale inhibitor may be considered a first solution, and the second scale precursor a second solution.

Thus, the invention also provides in a second aspect a method of abandoning a well or a zone in a reservoir, the method comprising the steps of:
optionally introducing into the reservoir a first solution or mixture comprising a first scale precursor and a scale inhibitor;
introducing into the reservoir the first solution or mixture comprising the first scale precursor and the scale inhibitor, and a second solution or mixture comprising a second scale precursor, wherein the first and second scale precursors react together to form scale;
stopping the introduction into the reservoir of the first solution or mixture comprising the first scale precursor and the scale inhibitor, and the second solution or mixture comprising the second scale precursor; and
introducing again into the reservoir a first, usually the first solution or mixture comprising a first usually the first scale precursor and a, usually the, scale inhibitor, and a second, usually the second solution or mixture comprising a second, usually the second scale precursor, wherein the first and second scale precursors react together to form scale.

The inventors of the present invention have discovered that the step of stopping and then restarting the treatment is more effective and without wishing to be bound by theory consider that that scale may more readily form in the reservoir if there are nucleation points or sites generated in step (i). The nucleation points or sites may also be pre-existing scale present in the reservoir, which may act to seed the scaling reaction. The stopping and (re-)introducing steps may be repeated once or more times such as 2, 3, 4, or 5 or more times.

Both the first and second solutions/mixtures of the second aspect could each contain a scale inhibitor; the scale inhibitor present in each in this case could be the same or equally may be different. Similarly, the amount of scale inhibitor provided in each of the two solutions may be the same or different.

Nevertheless, the first and second scale precursors of the second aspect i.e. first and second solutions/mixtures containing these materials, are typically blended together prior to being introduced into the reservoir, either typically just before the mixtures solutions enter the well or when one solution/fluid is pumped down a tubing and the other pumped down an annular space between the tubing and the casing, so they mix just prior to entering the reservoir and are then able to react together to form the scale.

Optional and preferred features described below, are independently optional and preferred features for the first and second aspects of the invention, and the third aspect, set out further below, of the invention.

The scale inhibitor, the first scale precursor and the second scale precursor of the mixture are usually the same as the scale inhibitor, the first scale precursor and the second scale precursor of the further mixture, respectively although they can be different.

The mixtures are normally introduced via tubing in the well. The tubing may be production tubing, or coiled tubing. The mixtures normally contain water and are usually solutions. Seawater or a separate brine solution may be used to make the solutions or brines e.g. calcium chloride sodium or ammonium sulphate.

The method can be used to abandon a zone, or indeed abandon the whole well.

For certain embodiments, a stream of water is spiked with the scale inhibitor, the first precursor and the second precursor of the mixture and the stream of water and mixture are introduced into the well together.

It is preferred to add or spike the scale inhibitor of the mixture into the stream of water before the first and second scale precursors of the mixture. The first scale precursor of the mixture may be spiked into the stream of water before the second scale precursor of the mixture.

The same stream of water may therefore be spiked in series with at least two of the components of the mixture.

The water used is typically at least one of sea water, produced water and oilfield brine, often sea water if available. The water is normally pre-filtered and of injection quality.

The first and second solutions/mixtures may contain additional components as appropriate for specific applications. Additional components may include viscosity modifiers, flow improvers, surfactants, emulsifiers etc.

In alternative embodiments, the method may comprise the step of introducing separately into the reservoir the first and the second solutions.

The method of treating a well in a reservoir may include the step of preconditioning the reservoir and/or preparing the reservoir such that scale and damage is effected more readily and more rapidly using the nucleation sites. The reservoir may be referred to as the reservoir formation.

The method of treating a well in a reservoir of the present invention may include the creation of nucleation sites in the reservoir optionally also by a flush(s) or pre-flush(s) with water, or wellbore cleaner fluid, or optionally by the first solution comprising a first scale precursor and a scale inhibitor.

The method optionally includes a pre-flush step before step (i) with water or by introducing into the reservoir the first solution comprising a first scale precursor and a scale inhibitor. The volume of the first solution introduced into the reservoir is typically chosen to match or at least substantially match a known or estimated equivalent volume of the reservoir within a known or estimated radius from the centre of the well. The volume of the reservoir may be referred to as the pore volume of the reservoir. The volume of the water or first solution introduced into the reservoir typically means that most, substantially most or all of the suitable sites in the reservoir or reservoir formation are occupied by the scale inhibitor. The sites may be referred to as adsorption sites. The volume of the first solution introduced into the reservoir may be described as the reservoir radial volume.

This pre-flush step, when used, is typically stopped before step (i). The method typically then includes the step (i) of introducing into the reservoir the first scale precursor, the scale inhibitor, and the second scale precursor (optionally as solutions as described above). This step may be referred to as a pre-treatment step. The amount of scale inhibitor is chosen such that scale formation is inhibited for long enough to allow the mixture to enter the reservoir to a known or estimated radius from the centre of the well. The amount of scale inhibitor may be referred to as an inhibitory quantity of scale inhibitor The known or estimated radius of the reservoir from the centre of the well may be referred to as the near well bore.

The method typically then includes the step (ii) of stopping the introduction into the reservoir of the mixture which may be done for from 2 to 24 hours, normally from 4 to 12 hours and optionally from 4 to 6 hours before step (iii).

This step may include shutting in the well. Shutting in the well typically means that no fluids and/or solutions are introduced and/or removed from the well during this time. The step of shutting in the well is typically for the creation and/or formation of the nucleation points or sites.

The method may further include a step of displacing the mixture out of the tubing, for example into the reservoir, subsequent to step (i) and prior to step (ii). Thus, whilst the introduction is stopped during step (ii), this would mitigate any scale formation in the tubing.

The method then includes the step (iii) of introducing into the reservoir the further mixture or solution comprising a first scale precursor, scale inhibitor, and a second scale precursor. It may be an advantage of the present invention that because the reservoir has been conditioned or preconditioned such that scale has already been formed and deposited in the reservoir, this preformed or pre-existing scale provides the nucleation sites for the formation of more scale. It may be an advantage of the present invention that more scale is typically formed compared to if the pre-treatment step had not been performed. It may also be an advantage of the present invention that the scale typically forms faster compared to if the pre-treatment step had not been performed.

The step (iii) of introducing into the reservoir the further mixture comprising a first scale precursor, scale inhibitor, and a second scale precursor is typically then continued until an increased fluid back pressure from the reservoir is such that no more can be introduced. The increased fluid back pressure from the well is an indication that an impermeable barrier has been created. This impermeable barrier is typically impermeable to fluid, normally including liquids and gases. The impermeable barrier typically inhibits and/or prevents the flow of fluids, normally gases and liquids from the reservoir into the well. The well can therefore be abandoned.

The steps of the method are typically in the order presented above.

First Scale Precursor

The first scale precursor is typically a soluble inorganic salt. For ease of reference, this soluble inorganic salt can be referred to as the first inorganic salt. The first inorganic salt may be a salt of a Group 1 metal or ammonium in which it provides the cationic species. Sodium or potassium or ammonium are preferred and ammonium is a particularly preferred cation. The counterion of the first inorganic salt may be an inorganic anion. This may be a single element or a complex anion. Sulphate is particularly preferred as an anion. Carbonate or bicarbonate could also be used as an anion.

The sodium or ammonium sulphate embodiment may be a sodium or ammonium sulphate brine.

As noted above, ammonium sulphate has surprisingly been found to be particularly effective.

More generally therefore, the invention also provides in a third aspect, a method of abandoning a zone in a reservoir, the method comprising the step of introducing to the reservoir, via a well, a mixture comprising a scale inhibitor, a first scale precursor and a second scale precursor, wherein the first and second scale precursors react together to form scale; wherein the first scale precursor comprises ammonium sulphate.

Features described herein for earlier embodiments are independently options for the third aspect of the invention, although it is limited to the first scale precursor comprising ammonium sulphate.

Second Scale Precursor

The second scale precursor is typically a soluble inorganic salt. For ease of reference, this soluble inorganic salt can be referred to as the second inorganic salt. The second inorganic salt may be a salt of a Group 2 metal in which the Group 2 metal provides the cationic species. Although, in principle, the Group 2 metal could be calcium, strontium or barium, calcium is preferred because it is both more economical and less toxic. The counterion of the second inorganic salt is may be an inorganic anion. The anion may be referred to as a scaling anion. Suitable anions include halide anions, and amongst these chloride is particularly preferred. Other anions which also form a soluble salt with the Group 2 metal could in principle be used. For example, nitrates form soluble salts with Group 2 metals and thus would be suitable although less preferred on grounds of cost and environmental impact.

The calcium chloride embodiment may be a calcium chloride brine.

Inhibitor

The scale inhibitor may be referred to as a scale-formation inhibitor. This inhibitor may be any scale-forming inhibitor known in the art.

The scale inhibitor may also be selected from the group consisting of: a carboxylic acid, a carboxylate, an acrylic acid, an acrylate, a phosphonate, a carboxylic based sulphonate, a phosphonic acid, a sulfonate, a sulfonic acid, a maleic acid, a maleate, an aspartic acid, an aspartate, a polysaccharide, a polyvinyl and a phosphinocarboxylic acid salt, or a derivative, polymer, copolymer thereof, or a combination thereof. In particular the scale inhibitor may be a phosphonate, acrylate, and carboxylate; or acids thereof. For example, the scale inhibitor may be a polyphosphinocarboxylate polymer and/or a diethylenetriaminepentaacetic acid based phosphonate and/or a pentamethylenephosphonic acid. The scale inhibitor may be Bellasol S50™ or Briquest™ or Dequest 2066A™.

The scale inhibitor typically reduces the rate of reaction between the first and second scale precursors or between other components and/or substances of the mixtures solutions and a fluid in the reservoir or between components and/or substances of the mixtures solutions. It therefore serves to reduce the rate of scale formation. If for example the mixture comprises sodium or ammonium sulphate and barium chloride respectively, the scale inhibitor may reduce the rate of reaction between these two components and therefore the rate of production of barium sulphate.

The scale inhibitor typically does not prevent scale production, rather it affects, typically slows, reaction kinetics, that is the rate of reaction between components of the first and/or second solution. It is this that allows the rate and, more importantly, the position of scale formation to be controlled in the method of the invention.

The scale inhibitor normally therefore needs to be in a sufficient concentration, known as the minimum inhibitory concentration (MIC). The MIC is determined by a number of factors, the thermodynamic drive of components of the mixtures or solutions, the physical conditions in the well such as temperature, pressure and pH; and the length of time scale inhibition is required. Typically for any given system the time that scale inhibition is required is proportional to the concentration of scale inhibitor present assuming all other variables are constant.

The concentration of scale inhibitor in the mixtures or the solutions may be from 0.1% to 10%. The scale inhibitor may substantially reduce the rate of scale formation for up to 24 hours, typically up to 12 hours and preferably from 4 to 8 hours after adding the mixtures into the reservoir to form a scale. The scale inhibitor may substantially reduce the rate of scale formation for up to 12 hours, typically up to 6 hours and preferably from 1 to 2 hours after the step of adding the mixtures into the reservoir to form a scale.

After the step of adding the mixtures into the reservoir to form a scale, the scale inhibitor may adsorb onto surfaces of the reservoir. Adsorption of the scale inhibitor reduces the amount of the scale inhibitor available. The amount of the scale inhibitor reduces and/or diminishes with an increase in the distance from the well. It may be an advantage of the present invention that this acts to accelerate scaling and precipitation within the reservoir in these areas.

As subsequent scale inhibitor enters the reservoir, an equilibrium between adsorbed scale inhibitor and free scale inhibitor is normally achieved. It may then be desirable to reduce the amount of inhibitor added to the well to take account of this and therefore allow scale to form closer to the well and/or well bore. The scale inhibitor may be added to the well as treated water.

The step of adding the solutions into the reservoir may continue until the injection pressure is close to or the same as the fracture pressure of the reservoir and/or no further solutions can be added. The step of adding the solutions into the reservoir may include injecting and/or pumping the solutions into the reservoir.

Inhibitor Reduction

In one embodiment, the overall amount of scale inhibitor provided reduces during the treatment process.

By utilising a relatively higher, as compared to later in the process, concentration of scale inhibitor at the beginning of the method, it is typically possible to ensure that the more remote parts of the reservoir are treated first and/or that scale formation is effected in those more distant locations first. It is a fairly common problem in certain prior art methods that scale formation can be erratic and/or not uniform. In more extreme applications, unwanted scale formation can occur at or near the well itself leading to a less effective sealing of the reservoir as a whole.

Embodiments of the present invention mitigate this difficulty with prior art methods by providing a two-component system. In addition, control of scale formation can be further enhanced by varying the concentration of scale inhibitor in the first solution as time progresses, or indeed by controlling i.e. reducing, the total concentration of scale inhibitors in the mixture(s). Thus, over the duration of the process the concentration of scale inhibitor may be reduced by a factor of at least ¼ i.e. a 25% reduction, and more preferably by a factor of at least ½ i.e. a 50% reduction relative to the initial concentration of scale inhibitor at the start of the process. In certain instances, the concentration is reduced by a factor of 10 or more. This may allow a more uniform formation of scale within the reservoir. Importantly, this allows the scale formation to start at the more distant parts of the reservoir and to progress back towards the well. This ensures a more effective sealing compared to prior art methods.

Scale

Scale formation occurs in the reservoir even though there is a scale inhibitor present in the mixture. The scale may be any inorganic scale. The scale may be barium sulphate or calcium sulphate. The scale typically forms a deposit on surfaces of the reservoir. The scale is typically a solid and normally a solid that is not readily soluble, by for example an acid and/or a hydrocarbon. The scale is therefore a relatively stable material and may be referred to as a very stable material at temperatures and pressures typically occurring at the bottom of a well in a reservoir.

Ideally the scale will have a solubility product ($K_{SP}$) at ambient temperature (25° C.) of $1\times10^{-5}$ and more preferably a $K_{SP}$ ambient temperature (25° C.) of $1\times10^{-6}$.

The scale formed in one embodiment is calcium sulphate. In this case, the first scale inhibitor will contain the sulphate anion. Preferably this is in the form of sodium or especially ammonium sulphate. The second solution will contain the calcium cation. The calcium cation is preferably in the form of calcium chloride. The calcium chloride and sodium or ammonium sulphate can then react to form the scale. One of the key benefits of calcium sulphate in particular is that it is highly insoluble. Furthermore, it is thermodynamically very stable and, having formed within the well, the reaction cannot easily be reversed. As such, its formation can be considered to be permanent. A further advantage of calcium sulphate is that its solubility reduces as temperature is increased. Consequently, at the elevated temperatures present in the reservoir it enjoys even lower solubility than under ambient conditions. This may also assist in the permanent nature of the scale that is formed.

For certain embodiments, the steps of the method may be represented by the following chemical equation:

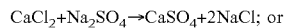

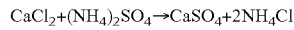

Gypsum is typically calcium sulphate dehydrate, that is $CaSO_4 \cdot 2H_2O$. It may be an advantage of the present invention that the calcium sulphate formed when the material is injected into the reservoir is gypsum.

Gypsum is a common mineral in cap and/or bed-rock and is therefore often drilled through when a well and/or well bore is formed. It may be advantage of the present invention that filling pores in the reservoir near the well with gypsum, does not significantly change the geology of the cap and/or bed-rock. It may also be an advantage of the present invention that whilst moderately water-soluble, gypsum is long lasting. It may further be an advantage of the present invention that whilst moderately water-soluble under reservoir conditions, the gypsum solids formed by this method are thermodynamically stable.

In an alternative embodiment, the scale is calcium carbonate. In this case, the first scale precursor will contain the carbonate anion or bicarbonate anion, and the second scale precursor will contain the calcium cation. The carbonate anion or bicarbonate anion are preferably in the form of sodium or ammonium carbonate or bicarbonate. Again, the calcium cation is preferably in the form of calcium chloride.

In the case of some scales, such as calcium sulphate, the rate and extent of scale formation increases with increasing temperature meaning that as the first and/or second solution enters the reservoir its temperature will eventually reach that of the reservoir causing more scale to form and further reducing the effectiveness of the scale inhibitor.

As the scale forms in the reservoir it acts to reduce the permeability of a formation of the reservoir and thereby progressively reduces the ability of hydrocarbons in the reservoir to access the well bore region and thereby acting to seal the reservoir from the surface.

Many oil producing reservoirs are heterogeneous in their permeability and pressure such that when fluid is pumped into the reservoir it will preferentially enter those zones of high permeability and/or low pressure. It may be an advantage that the method of the present invention is self-diverting, that is as the first and/or second solution enters the reservoir, and typically a formation of the reservoir, from the well and/or well bore, this reduces the susceptibility of the particular zone of the reservoir to receiving the first and/or second solution, thereby diverting more of the first and/or second solution into other zones, less susceptible to receiving the first and/or second solution. The well bore is then normally rendered impermeable to the reservoir surrounding it.

Third Solution/Mixture

The method may further include the step of injecting a third solution or mixture into the reservoir after the first and/or second solution, also referred to as scaling fluids, to create a "skin" and/or barrier between the reservoir and the well. The well may be perforated and/or have perforations. The well normally comprises perforations and/or may be perforated at a pay zone(s). The method may further include the step of at least partially filling and/or plugging and/or blocking the well and/or the well in the reservoir and/or perforations in the well with a third solution or mixture.

The third solution or mixture may comprise one or more of silicone, a vinyl silicone, a vinyl terminated silicone, polydimethylsiloxane, vinyl polydimethylsiloxane, a fumed silica, a silica flour and a siloxane. The third solution or mixture typically has a low to medium molecular weight, typically less than 10,000. The third solution or mixture typically has a viscosity below 0.5 Pascal seconds at a shear rate of $340\ s^{-1}$ using a chandler viscometer.

In use the third fluid normally creates a barrier between the reservoir and the well. The barrier between the reservoir and the well may prevent or mitigate or at least substantially prevent the passage of oil and/or gas from the reservoir into the well.

A platinum catalyst may be added to the third fluid at a concentration of less than 0.05% or from 0.05% to 0.1%. The platinum catalyst may cause the vinyl polydimethylsiloxane to undergo a crosslinking addition reaction to form a flexible elastic material which further isolates the well from the reservoir. An additional benefit of this step is typically that it results in the formation of a flexible self-healing material which swells in the presence of hydrocarbons. An advantageous feature of this material is that it will swell in the presence of hydrocarbons sealing any cracks or fissures.

The step of adding the mixtures into the reservoir typically results in the formation of scale from 0.1 to 3 metres away from the well and/or wall of the well. The step of injecting the third solution/mixture into the reservoir typically results in blocking annular spaces, pores, perforations and/or cracks in the reservoir and/or existing cement and/or concrete from an edge of the well to from 0.05 to 0.2 metres, typically from 0.02 to 0.2 metres away from the well and/or wall of the well.

It may be an advantage of the present invention that the combination of injecting the mixtures into the reservoir to form a scale, injecting a third substance into the reservoir and at least partially filling and/or plugging the well in the reservoir, tubing and/or casing with cement and/or concrete, provides three different barriers between the reservoir and the wider environment. This typically improves the end of life well integrity, in that as well as preventing oil escaping from the reservoir the method prevents or at least mitigates the release of gas, and/or mitigates the need for recourse to the use of a drilling rig.

After the step of injecting the first and/or second solution into the reservoir to form a scale, the first and/or second solution typically undergoes a change and/or transformation. After the step of injecting the third solution or mixture into the reservoir, the third solution or mixture typically undergoes a change and/or transformation. The change and/or transformation may be a reaction between other components of the first and/or second solution and the scale inhibitor or a temperature induced precipitation or inorganic precipitation of the first and/or second solution.

It may be an advantage of the present invention that the change and/or transformation results in the creation of blockages in annular spaces, pores and/or cracks in the reservoir. The creation of blockages may be referred to as damaging the reservoir. It may also be an advantage of the present invention that the blockages and/or damage cannot be reversed.

The step of introducing and/or introducing again into the reservoir the mixtures normally includes injecting the mixtures into the reservoir from the well. The well typically has an upper and a lower end. The step of injecting the mixtures into the reservoir to form scale such as calcium sulphate may include injecting the first and second solutions into the reservoir from the upper end.

The method of abandoning a well may be referred to one or more of a method of blocking a well, a method of filling a well, a method of plugging a well and purposeful damage of a well. The method of abandoning a well in a reservoir may include creating blockages in the reservoir, thereby reducing fluid communication between the reservoir and the well, typically from the reservoir to the well. The method of abandoning the well in the reservoir typically results in abandonment of the well, including reducing fluid communication between the reservoir and the well and the surface and/or seabed.

Plugging

The method may further include the step of at least partially filling and/or plugging the well and/or the well in the reservoir with cement and/or concrete. The cement typically comprises one or more of calcium oxide, silicon dioxide, aluminium oxide, a sulphate and ferric oxide. The concrete is typically a composite material comprising an aggregate, cement and water. The aggregate is normally sand or gravel.

The reservoir typically contains a fluid, the fluid may be crude oil and/or natural gas. The reservoir is typically a crude oil and/or natural gas reservoir. The reservoir typically contains crude oil and/or natural gas. The crude oil and/or natural gas may be referred to as hydrocarbons. The well is typically in a hydrocarbon reservoir. The well may be a former production well used to extract crude oil and/or natural from the reservoir.

The fluid in the reservoir is maintained at a pressure known as the reservoir pressure. For fluid to flow into the well, a pressure drop must be created resulting in a pressure differential between the well and the reservoir. As fluid approaches the well bore, the rate of change of pressure increases. This means that the formation of a barrier within the formation some distance from the well bore will be more effective than forming a barrier at the well bore across the perforated interval, as the differential pressure across the barrier is reduced.

Prior to abandonment it is the practice to reduce the pressure in the reservoir to a point where oil and/or hydrocarbons will no longer flow unaided and any oil and/or hydrocarbon loss to the surface occurs as a result of the oil and/or hydrocarbon having a lower density than water and so it floats through conduits between the casing and the reservoir to eventually discharge to the environment.

The method of abandoning a zone or a well in a reservoir may be referred to as plugging a zone or a well and typically involves blocking the flow of fluid up through the well from the reservoir to surface. It may be an advantage of the present invention that the method of abandoning a well blocks the flow of fluid, typically hydrocarbons and normally both oil and gas, up through the well and restricts the flow of fluid through at least part of the reservoir into the well.

The method of abandoning the well in the reservoir may be referred to as a method of treating a well in the reservoir. The well typically comprises a well bore.

The steps of introducing the solution(s) into the reservoir may include injecting and/or pumping the solution(s) into the reservoir.

The mixtures normally have a viscosity of from $0.5 \times 10^{-3}$ to $5 \times 10^{-3}$ Pascal seconds. The mixtures may have a low viscosity similar to that of water. It may be an advantage of the present invention that the viscosity of the materials is from $0.8 \times 10^{-3}$ to $1.5 \times 10^{-3}$ Pascal seconds because at these viscosities the materials are pumpable from the well into the reservoir. The mixtures may be referred to as having a low viscosity. The mixtures are typically pumpable from 0.2 to 3 metres through the reservoir away from the well.

The optional features of aspects of the present invention can be incorporated into other aspects of the present invention and vice versa. In other words, it is explicitly intended that preferred or optional features described in relation to one aspect of the invention may represent preferred or optional features in relation to another aspect of the invention, and vice versa.

Embodiments of the present invention will now be described by way of example only and with reference to the accompanying figures, in which.

Figure 1:
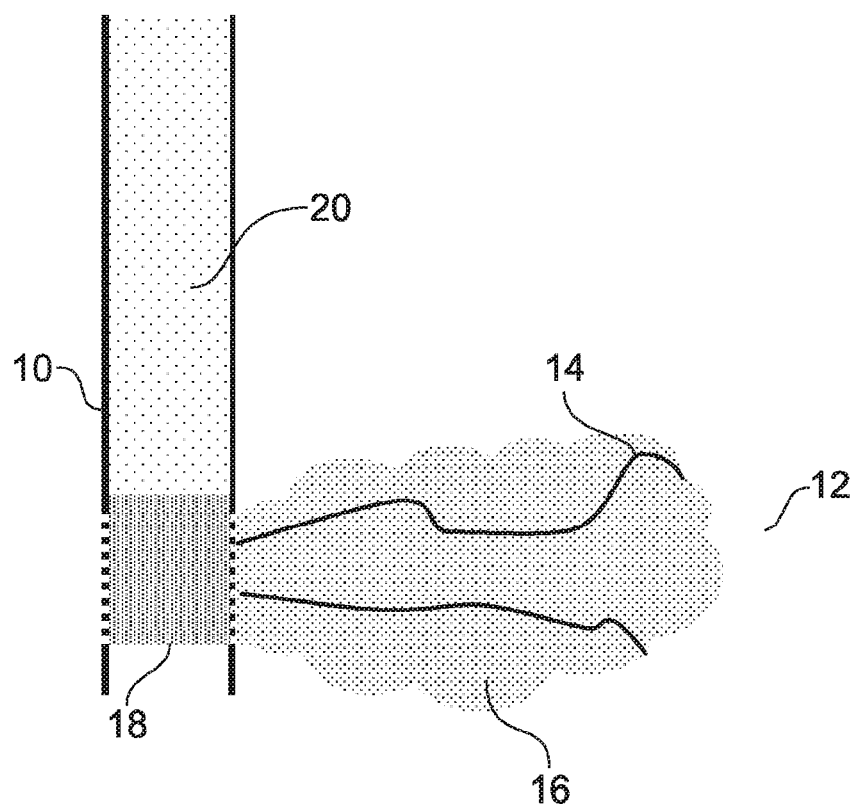
FIG. 1 is a cross-section of a hydrocarbon reservoir.

FIG. 1 shows a well 10 in a hydrocarbon reservoir 12. The hydrocarbon reservoir 12 has outer boundaries 14. Calcium chloride, sodium sulphate and a scale inhibitor are injected into the reservoir 12 to form scale 16.

A silicone 18 may be added into the well 10 to block the perforations in the well 10 and the well may be plugged with cement 20.

During the step of injecting the material into the reservoir to form calcium sulphate, the material initially passes into the most permeable sections of the reservoir. Calcium sulphate scale forms and the remaining material is diverted into other zones. At the same time the scale inhibitor adsorbs onto the surfaces of the rock (not shown) of the reservoir, increasing the tendency of the remaining material to form calcium sulphate scale due to a reduced amount of scale inhibitor in the material.

The quantity of calcium sulphate scale required to form a block in the reservoir can be considerable. To treat a 100 metre interval with a porosity of 25% such that scale forms a 'skin' that is 50 cms thick from the well bore, requires 19.6 m³ of scale to be deposited. It is not necessary to fill the whole pore space but rather to block the pore throats to mitigate fluid movement and/or reduce the effective permeability of the reservoir.

All fluid flow in a reservoir goes through the pores and pore throats of the reservoir rock. The pore throats are small gaps joined up by pores in the rock, through which the fluid passes. The fluid flow path is often tortuous. The ease with which fluid passes through a rock and therefore the pores and pore throats is known as its permeability.

The flow of fluid can be prevented by blocking the pore throats or by increasing the viscosity of the fluid passing through the pore throats. Because the pore throats are relatively narrow, a comparatively small amount of material in a pore throat can result in a significant amount of damage to the reservoir and therefore reduction in the overall permeability or ability of fluid to flow through the reservoir. If sufficient damage to the reservoir can be induced in the formation of the well, fluid in the reservoir is typically isolated and therefore cannot reach the well.

Figure 2:
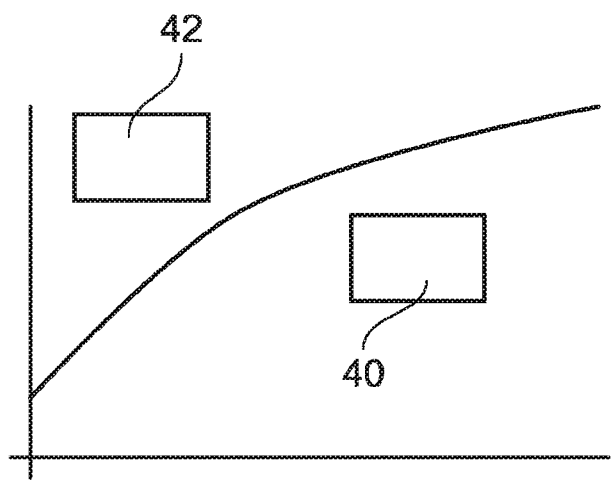
FIG. 2 is a graph of scale inhibitor concentration in a reservoir.

FIG. 2 is a graph of scale inhibitor concentration in a reservoir. The x-axis is time and the y-axis is inhibitor concentration.

The line on the graph of FIG. 2 presents a scaling boundary, that is when scale is produced 40 and when no scale is produced 42. Any point on the line represents a time at which precipitation of scale occurs at a given concentration of scale inhibitor at a given temperature.

By adjusting the scale inhibitor concentration, the time at which scale is formed and so the point in the well that scale precipitates, can be controlled. It is important that scale does not form in the well bore but only in the formation of the reservoir.

Figure 3:
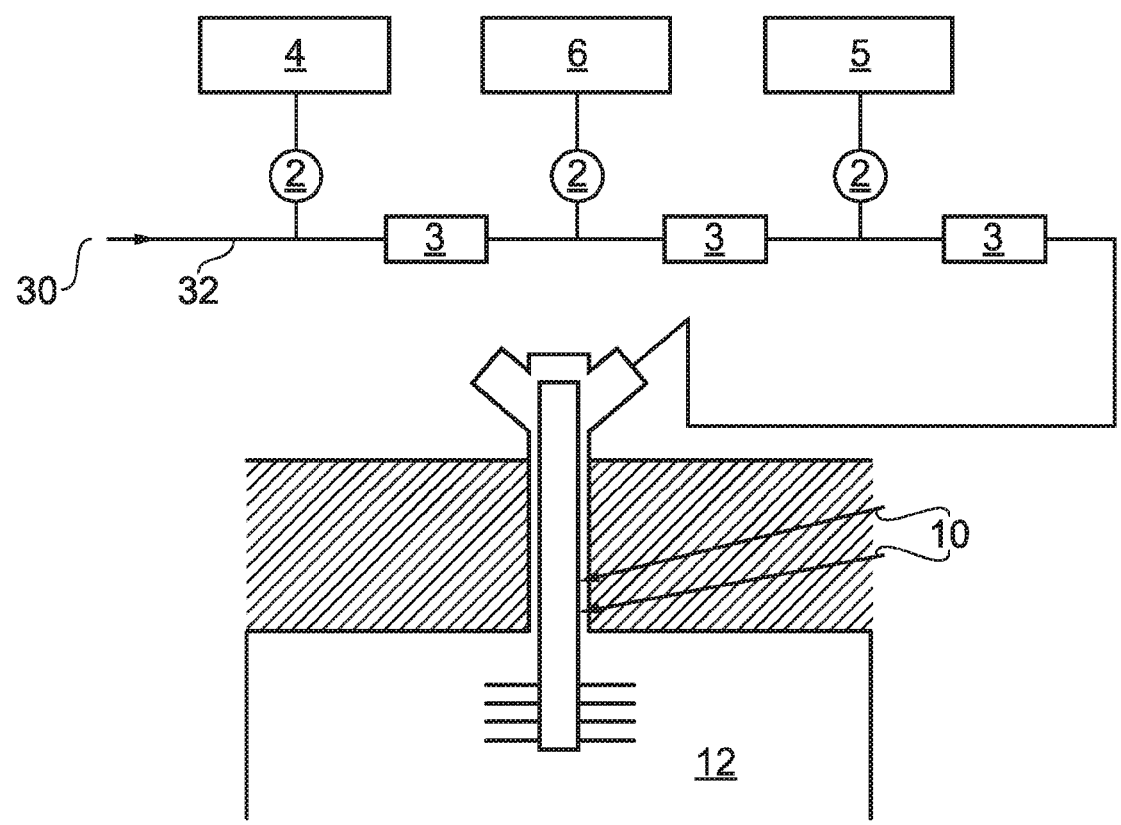
FIG. 3 is a schematic diagram of the method of treating a well in a reservoir

The method of abandoning the well 10 in the hydrocarbon reservoir 12, as shown in FIG. 3 includes mixing calcium chloride, sodium sulphate and a scale inhibitor to form a material; and injecting the material into the reservoir to form calcium sulphate.

FIG. 3 shows a source of water 30, typically filtered injection quality seawater in offshore locations. This is pumped into the well 10 to be treated via a manifold 32.

In one embodiment, a scale inhibitor 4 is dosed or spiked into the stream of water at a concentration of from 0.5 to 2.0 percent. The fluids pass through an inline mixer 3 and then dosed/spiked with a saturated solution of a sulphate brine 6, in this embodiment a sodium sulphate brine containing 139 g/ltr sodium sulphate, such that a concentration of from 0.5 to 1.0 Molar solution of sulphate ions is created in the water. The fluids are then passed through a second inline mixer 3 and then dosed/spiked with saturated calcium chloride containing 745 g/ltr calcium chloride 5 brine such that a concentration of from 0.8 to 1.2 Molar calcium ions is created in the water. The whole mixture of brines scale inhibitor and seawater is then injected into the well at a pump rate set such that the time taken from point of mixing to entry into the reservoir is less than the time taken for the waters to scale.

In an alternative embodiment, a scale inhibitor 4 is dosed/spiked into the stream of water at a concentration of 0.1-2.0%. The fluids pass through an inline mixer 3 and are then dosed/spiked with a saturated solution a sulphate brine 6, in this embodiment an ammonium sulphate brine containing 239 g/ltr ammonium sulphate such that a concentration of from 0.5 to 1.0 Molar solution of sulphate ions is created in the water. The fluids are then passed through a second inline mixer 3 and then dosed/spiked with saturated calcium chloride containing 299 g/ltr calcium chloride brine 5 such that a concentration of from 0.8 to 1.2 Molar calcium ions is created in the water. The whole mixture of brines scale inhibitor and seawater is then injected into the well at a pump rate set such that the time taken from point of mixing to entry into the reservoir is less than the time taken for the waters to scale.

Introduction of the scale inhibitor into the water before the scale precursor solutions is preferred as this can mitigate scale formation due to interactions between the precursor sulphate ions with ion already present in seawater. Pumps 2 may be referred to as dosing pumps.

The scale inhibitor may be added to the sulphate brine, but is typically added separately as described above.

The rate and therefore the location of scale formation within the reservoir can be controlled by making adjustments to the scale inhibitor concentration, the molar concentrations of either calcium or sulphate ions or the overall pump rate.

The method may also include injecting into the reservoir a dilute solution of an acid such as hydrochloric acid, formic acid, acetic acid and/or citric acid. The dilute solution of acid is at a concentration of from 0.25 to 5%.

The dilute solution of an acid is injected into the reservoir prior, sometimes just prior, to scale inhibitor treated scaling waters. The subsequent scale inhibitor treated scaling waters mix with the dilute solution of an acid and on contact therewith this lowers the pH of the scale inhibitor treated scaling waters thereby rendering the scale inhibitor inactive and accelerating the scaling process.

In an alternative embodiment, one of the brines, ideally the second calcium containing brine 5 maybe pumped via coiled tubing with remaining fluids injected at the well head into the production tubing 8 such that mixing of fluids and the commencement of scale formation occurs across the perforated interval 9 and scale is formed within the reservoir. Assuming a porosity of 25%, this equates to a volume of approximately 400 litres of each brine per metre of reservoir interval. Both brines are filtered and scale inhibitor is added to both at a concentration sufficient to prevent scale formation. This concentration is determined by a series of experiments and may vary depending on the conditions of the well.

Further alternatively, the dilute solution of acid can be pumped into the reservoir formation before the brines 6 and 5 and before the scale inhibitor 4. When the brines 6 and 5 contact the dilute solution of acid the pH of the brines 6 and 5 is reduced, thereby rendering the scale inhibitor ineffective. Yet further alternatively the dilute solution of acid can be pumped into the well after the brines 6 and 5 or some of the dilute solution of acid can be pumped into the well before and some after the brines 6 and 5. Fluid is pumped into the reservoir until a back pressure builds up indicating that the permeability of the reservoir is significantly reduced or the back pressure does not exceed the fracture pressure of the reservoir Experiments were used to determine the time it took for the formation scale using different sulphate salts as the first scale precursor and with the addition of different scale inhibitors.

Initially, the experiments were carried out using sodium sulphate and calcium chloride as the scale precursors, with either Bellasol S50™, a polyphosphinocarboxylate polymer scale inhibitor, or Briquest 543-45AS™, a diethylenetriaminepenta acetic acid based phosphonate scale inhibitor. It was then discovered that using ammonium sulphate instead of the sodium scale may be advantageous for offshore applications and, consequently, further experiments were performed using ammonium sulphate and calcium chloride as scale precursors, with Dequest 2066A™ as the scale inhibitor.

Experiments using sodium sulphate:

The experiments were repeated at various Bellasol S50™ and Briquest 543-45AS™ inhibitor concentrations and at a pH of 7 and 4 respectively. A plastic cup was placed onto of a white sheet of paper with a black cross drawn on it, allowing the formation of calcium sulphate to be evaluated by the disappearance of the cross. 10 ml of the $CaCl_2$ solution and 10 ml of $Na_2SO_4$/inhibitor solution were measured and placed into the plastic cup. As soon as the brines were mixed together a timer was started.

Photos were taken every 30 minutes until the cross was no longer visible. It was however possible to observe a clear development in the formation of scale. In a pre-scaled cup the cross was completely visible. During the progression of scale formation, there was a reduction in visibility of the cross due to low levels of scale formation. A completely hidden cross indicated that the inhibitor had become completely ineffective and scale had fully formed. After 24 hours, the solution was filtered and the precipitate was weighed to determine the mass of calcium sulphate that had formed.

Tables 1a and 1b below show inhibition times, that is how long the formation of scale is inhibited using various concentrations of Bellasol S50™ and Briquest 543-45AS™.

"M" in tables 1a and 1c means Molar

TABLE 1a

Blank

| Inhibitor Concentration (ppm) | Volume Na$_2$SO$_4$ (ml) | Volume CaCl$_2$ (ml) | Low level Calcium sulphate Formation Time (mins) | Full Scale Formation Time (mins) | Mass of precipitate after 24 hours (g) |
|---|---|---|---|---|---|
| 0 | 10 | 10 | — | 0 | 55.0 |

Bellasol S50 ™

| Inhibitor Concentration (ppm) | Conc. Na$_2$SO$_4$ (M) | Conc. CaCl$_2$ (M) | Low level Calcium sulphate Formation Time (mins) | Full Scale Formation Time (hrs) | Mass of precipitate after 24 hours (g per litre fluid) |
|---|---|---|---|---|---|
| 5,000 | 1.0 | 1.0 | 30 | 24 | 42.5 |
| 25,000 | 1.0 | 1.0 | 90 | 24 | 40.5 |
| 50,000 | 1.0 | 1.0 | 120 | 24 | 41.0 |
| 75,000 | 1.0 | 1.0 | 180 | 24 | 41.5 |
| 100,000 | 1.0 | 1.0 | 240 | 24 | 44.5 |

Briquest 543-45AS ™

| Inhibitor Concentration (ppm) | Conc. Na$_2$SO$_4$ (M) | Conc. CaCL$_2$ (M) | Low level Calcium sulphate Formation Time (mins) | Full Scale Formation Time (mins) | Mass of precipitate after 24 hours (g per litre fluid) |
|---|---|---|---|---|---|
| 5,000 | 1.000 | 1.000 | 30 | — | 28.5 |
| 10,000 | 0.739 | 1.06 | 40 | — | 50 |
| 25,000 | 1.000 | 1.000 | 90 | — | 16.0 |
| 50,000 | 1.000 | 1.000 | 720 | — | 12.5 |
| 100,000 | 1.000 | 1.000 | 2880 | — | 11 |

TABLE 1b

Blank

| Inhibitor Concentration (ppm) | Volume Na$_2$SO$_4$ (ml) | Volume CaCl$_2$ (ml) | Low level Calcium sulphate Formation Time (mins) | Full Scale Formation Time (mins) | Mass of precipitate after 24 hours (g) |
|---|---|---|---|---|---|
| 0 | 10 | 10 | — | 0 | 1.1 |

Bellasol S50 ™

| Inhibitor Concentration (ppm) | Volume Na$_2$SO$_4$ (ml) | Volume CaCL$_2$ (ml) | Low level Calcium sulphate Formation Time (mins) | Full Scale Formation Time (hrs) | Mass of precipitate after 24 hours (g) |
|---|---|---|---|---|---|
| 5,000 | 10 | 10 | 30 | 24 | 0.85 |
| 25,000 | 10 | 10 | 90 | 24 | 0.81 |
| 50,000 | 10 | 10 | 120 | 24 | 0.82 |
| 75,000 | 10 | 10 | 180 | 24 | 0.83 |
| 100,000 | 10 | 10 | 240 | 24 | 0.89 |

Briquest 543-45AS ™

| Inhibitor Concentration (ppm) | Volume Na$_2$SO$_4$ (ml) | Volume CaCL$_2$ (ml) | Low level Calcium sulphate Formation Time (mins) | Full Scale Formation Time (mins) | Mass of precipitate after 24 hours (g) |
|---|---|---|---|---|---|
| 5,000 | 10 | 10 | 30 | — | 0.57 |
| 25,000 | 10 | 10 | 90 | — | 0.32 |
| 50,000 | 10 | 10 | 720 | — | 0.25 |
| 100,000 | 10 | 10 | 2880 | — | 0.22 |

TABLE 1c

| CaCl2 (M) | Na2SO4 (M) | Inhibitor (%) | Hazying (mins) | Scaling (mins) | Weight (g/100 ml) |
|---|---|---|---|---|---|
| 1.06 | 0.739 | 0 | 0 | 0 | 6.19 |
| 1.06 | 0.739 | 0.75 | 12 | 15 | 0.5 |

A concentration range of inhibitor from 5000 ppm (0.5%) to 100,000 ppm (10%) was used throughout.

100 ml of each inhibitor concentration was prepared. Appropriate volumes of inhibitor were measured into a volumetric flask and made up to 100 ml with Na$_2$SO$_4$. Inhibitors were only added to the Na$_2$SO$_4$ solution due to both being insoluble in CaCl$_2$. The pH of each of inhibitor stock solutions was altered accordingly, see Table 2 below.

TABLE 2

| Inhibitor (ppm) | Buffer solution | pH Required |
|---|---|---|
| Bellasol S50 ™ | NaOH | 7 |
| Briquest 543-45AS ™ | NaOH | 4 |
| Dequest 2066A ™ | NaOH | 4 |

Tables 1a and 1b show that when no inhibitor is applied to the Na$_2$SO$_4$ brine, and the brine is then mixed with CaCl$_2$, the solution becomes fully scaled instantly. When either inhibitor is added to the Na$_2$SO$_4$ brine, the formation of calcium sulphate is initially postponed. When the Bellasol S50™ is added, scale production is in two stages. Stage one involves the inhibitor retarding the growth, but not being able to completely block the development of, the crystals. This is illustrated by the formation of low levels of calcium sulphate. As time progresses stage two involves the inhibitor becoming less effective and becoming consumed in the growth of the crystal lattice. This is represented by a change from the large crystals into smaller, more stable crystals of calcium sulphate.

It was noted that, in the examples where calcium chloride and sodium sulphate were equimolar, the Briquest 543-45AS™ inhibitor never allowed the final crystal structure of calcium sulphate to be achieved and only allowed low levels of calcium sulphate to be formed. This indicates that the inhibitor could have been irreversibly adsorbed at the active growth sites of the calcium sulphate scale crystals, resulting in complete blockage, halting the production of the smaller more stable crystals of calcium sulphate. Use of a reduced concentration of sodium sulphate and a slightly increased concentration of calcium chloride resulted in a large gain in scale precipitation, to levels above those seen for Bellasol S50™.

Tables 1a and 1b show that both inhibitors postponed the formation of calcium sulphate for different lengths of time dependant on their concentration. A general trend was that as the concentration was increased, the time taken for the calcium sulphate scale to form also increased. The Bellasol S50™ inhibitor prevented the growth of calcium sulphate from 30 minutes to 240 minutes whilst the Briquest 543-45AS™ inhibitor could inhibit the growth from 30 minutes to 48 hours, although full scaling was never achieved.

The mass of calcium sulphate scale produced after 24 hours using both inhibitors is shown in tables 1a and 1b. When compared to the blank sample it was highlighted that the Bellasol S50™ inhibitor produced a comparable mass of precipitate. This is compared to the equimolar brine and Briquest 543-45AS™ inhibitor tests, which produced a considerably lower mass (around 75% less) compared to the blank sample. However, using a lower ratio of sodium sulphate to calcium sulphate greatly increased the scale produced for Briquest 543-45AS™. Even so the quantity of scale produced in the inhibited system even after 24 hours was between 5 and 7 g/ltr compared to the blank where a quantity in excess of 60 g/ltr of scale was formed.

It was shown that the formation of calcium sulphate scale, from solutions of calcium chloride and sodium sulphate, can be controlled between 30 minutes and 48 hours using different scale inhibitors and adjusting the concentration of the inhibitors and the pH.

A number of laboratory tests have been conducted to investigate the method of abandoning including the stopping step. A widely accepted technique to determine the effect on permeability of injecting fluids into an oil bearing reservoir is to conduct core flood experiments. A piece of reservoir core or sandstone of similar permeability to the reservoir is cut to provide a core—a cylinder typically one inch in diameter and between three to six inches long. This core is mounted in a coreflood holder such that fluid can be pumped through the core. Typically fluid is pumped through the core at a steady flow rate, typically using a syringe pump. The pressure differential across the core is measured and this is directly proportional to the permeability of the core. If the pressure differential decreases, permeability is enhanced and the core is stimulated.

Conversely if the pressure differential increases, permeability is diminished and the core is damaged.

Figure 4:
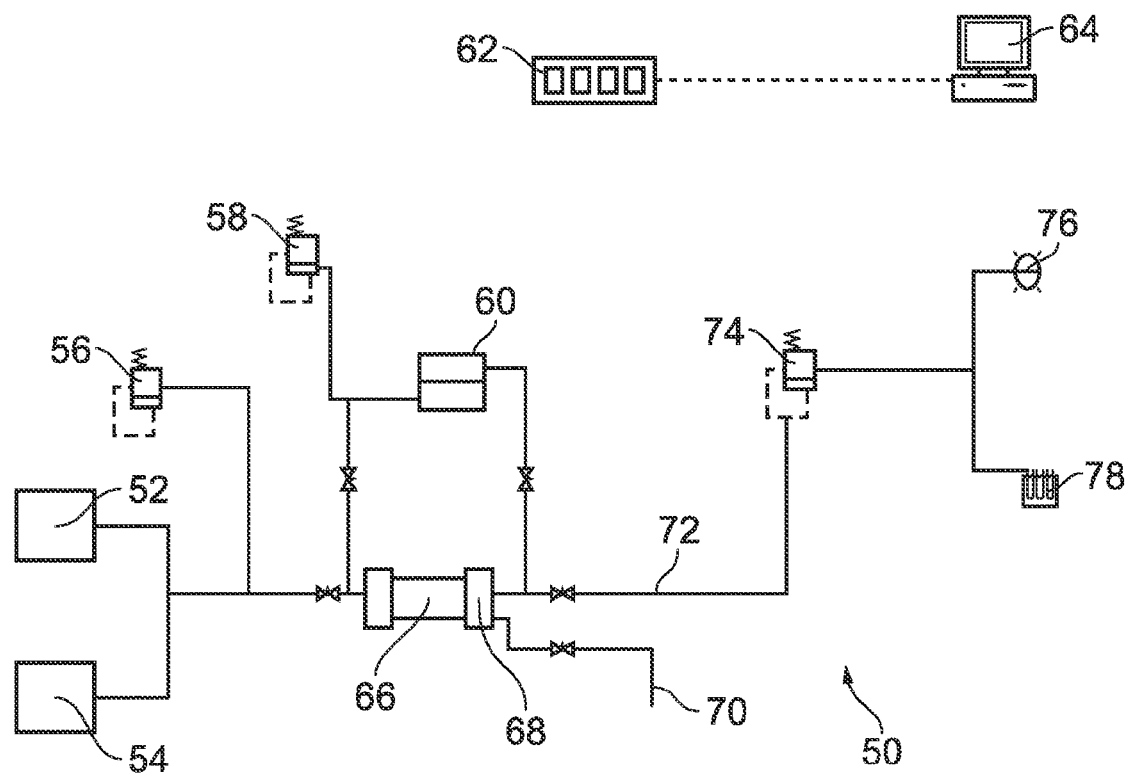
FIG. 4 is a schematic of a typical core flood apparatus.

Fluid that has passed through the core was collected and analysed. FIG. 4 shows a schematic of a typical core flood apparatus.

The core flood apparatus (50) shown in FIG. 4 has two pumps, pump A (52) and pump B (54). Pump A (52) pumps a calcium brine solution; pump B (54) pumps an inhibitor in sulphate solution (/SI). The apparatus (50) has a bleed line and valve (56), pressure relief valve (58), pressure transducer (60), display readout (62) and computer (64). A core sample (not shown) is held in the core holder (66) that has twin port plates for face and line cleaning (68). One of the twin port plates for face and line cleaning (68) has a clean/back flush line (70) attached. The outlet line (72) is attached to a flow regulating valve (74) and then a UV analyser (76) and fraction collector (78).

The following procedure was adopted. The following solutions were prepared: a solution containing 21,000 mg/ltr of calcium by dissolving calcium chloride powder in water to produce a calcium brine; and a solution containing 35,500 mg/ltr of sulphate by dissolving sodium sulphate powder in water to produce a sulphate brine. A quantity of Briquest 543-45AS™, a commercially available salt of diethylenetriaminepentamethylene phosphonic acid (DTPMP), a scale inhibitor, was added to the sulphate brine to achieve a concentration of 5,000 mg/ltr of Briquest 543-45AS™.

A core of Berea sandstone was cut and placed into the core holder apparatus. The available pore volume of the core was estimated to be 14 ml. A volume of the sulphate brine containing 5000 mg/ltr of scale inhibitor, equivalent to one pore volume, was introduced into the core and the scale inhibitor adsorbed on the surface. This was followed by three pore volumes of prepared calcium brine mixed with scale inhibitor containing sulphate brine. Pumping was stopped and the mixture was left in the core for a period of five hours, during which time the protection afforded by the inhibitor would have been lost and any scale formed would have precipitated within the core. During this time a pressure differential across the core was determine at 10 psi.

After five hours flow was recommenced. No change in differential pressure was initially observed and this was as expected since only 0.7 g scale, equivalent to 3% of the pore volume, was estimated to have precipitated. However, once pumping recommenced the differential pressure across the core increased rapidly such that after five pore volumes the pressure exceeded 100 psi.

Figure 5:
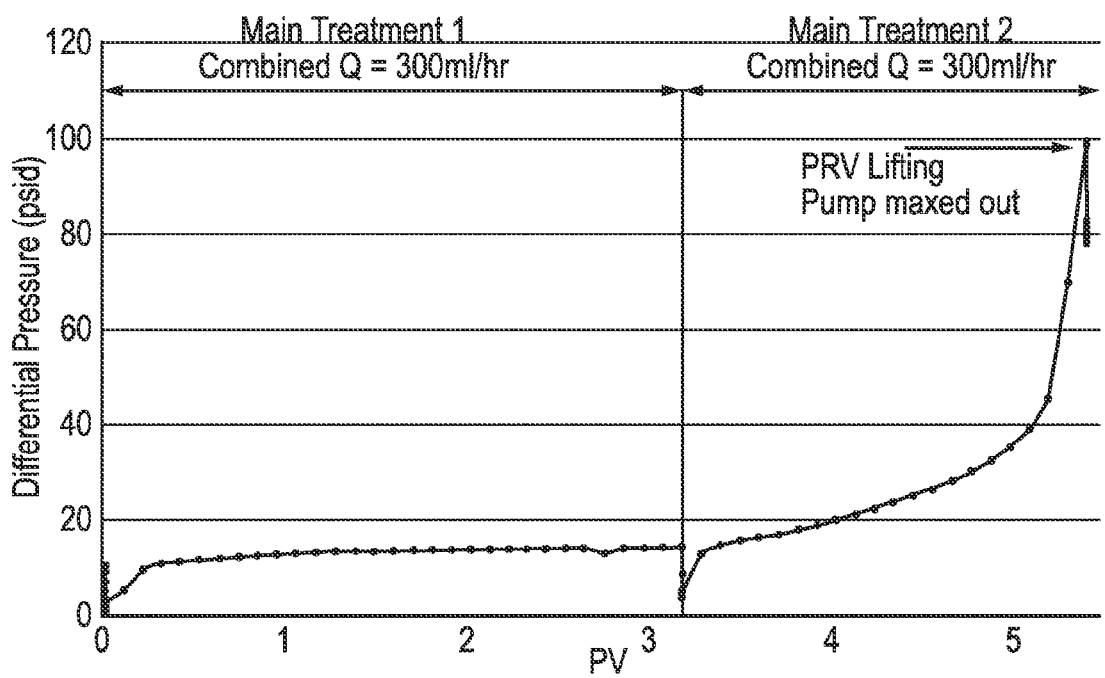
FIG. 5 is a plot of differential pressure versus pore volume for a first coreflood experiment.

FIG. 5 is a plot of differential pressure versus pore volume (PV) for the coreflood. During the initial treatment a differential pressure of about 13 psi was needed to achieve a flow rate of 300 ml/hour or 21 pore volumes (PV's) and there was little evidence of any damage to the core. However, after the core was shut in for five hours and flow restarted, differential pressure build up started to occur almost immediately and within 2 PV's from restarting the differential pressure exceeded 100 psi, activating the pressure relief valve in the equipment. This equates to a reduction in permeability of over eighty percent.

Figure 6:
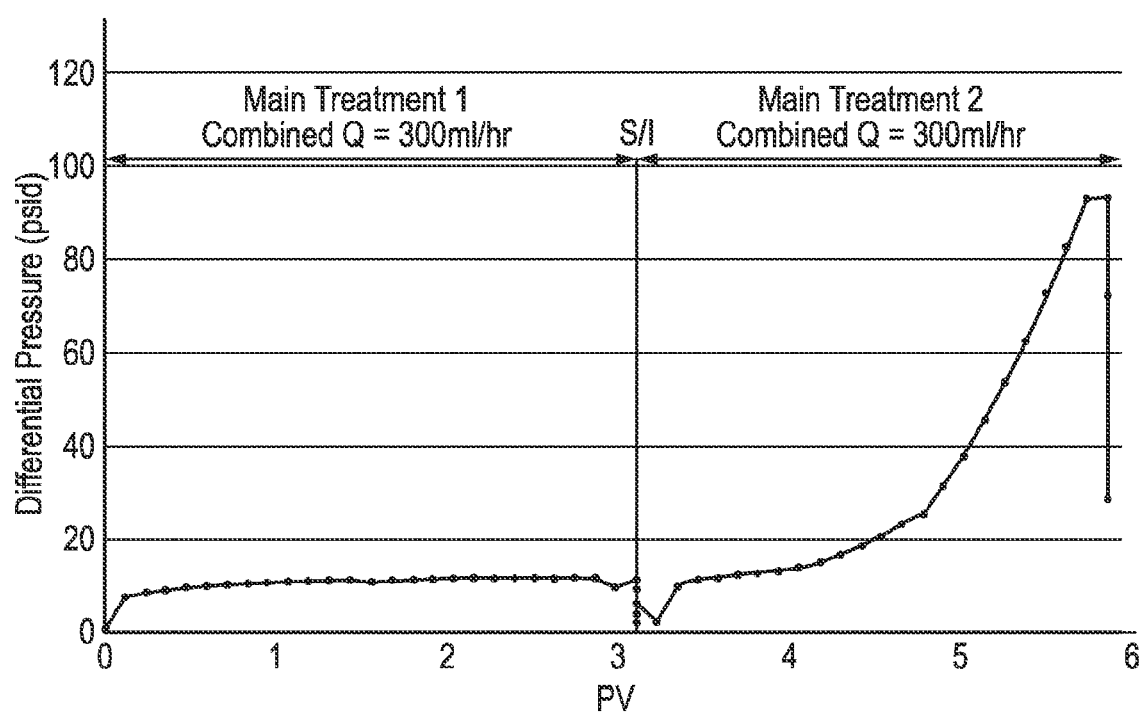
FIG. 6 is a plot of differential pressure versus pore volume for a second coreflood experiment.

This was surprising and unexpected and so the test was repeated with a different core. The results are shown in FIG. 6. The results were very similar to the previous core flood experiment with differential pressure exceeding 100 psi. The rapid reduction in permeability was surprising and it was much more rapid and complete than was expected considering only five pore volumes of fluid had been injected, and by calculation only fifteen percent of the total pore volume is occupied by scale.

TABLE 3a

| Salt used as first scale precursor | Dequest 2066A™ Inhibitor Conc. (ppm) | Conc. Na$_2$SO$_4$ or (NH$_4$)$_2$SO$_4$ (M) | Conc. CaCl$_2$ (M) | Low level Calcium sulphate Formation Time (mins) | Mass of precipitate after 24 hours (g) |
|---|---|---|---|---|---|
| Sodium | 10,000 | 0.739 | 1.06 | 40 | 50 |
| Ammonium | 10,000 | 0.739 | 1.06 | >180 | — |
| Ammonium | 5,000 | 0.739 | 1.06 | 33 | 60 |
| Ammonium | 2,500 | 0.739 | 1.06 | 15 | — |

TABLE 3b

| Type of water used | Dequest 2066A™ Inhibitor Conc. (ppm) | Conc. $(NH_4)_2SO_4$ (M) | Conc. $CaCl_2$ (M) | Low level Calcium sulphate Formation Time (mins) | Mass of precipitate after 24 hours (g) |
|---|---|---|---|---|---|
| Fresh | 2,500 | 2.22 | 2.69 | 30 | 20-30 |
| Sea | 2,500 | 2.22 | 2.69 | 15 | — |
| Sea | 3,000 | 2.22 | 2.69 | 30 | 20-30 |

Experiments involving ammonium sulphate:

Further experiments were carried out using ammonium sulphate instead of sodium sulphate as the first scale precursor with an aim to replicate the scaling time observed when using the sodium salt. As before, calcium chloride was used the second scale precursor. Dequest 2066A™, a commercially available salt of diethylenetriaminepentamethylene phosphonic acid (DTPMP), was used as the scale inhibitor. The scale inhibitor was modified to have pH of 4 as shown in Table 2.

As before, the apparatus used comprised a plastic cup placed onto a white sheet of paper with a black cross drawn on it, allowing the formation of calcium sulphate to be evaluated by the disappearance of the cross. 50 ml of the calcium chloride solution and 50 ml of the solution comprising ammonium sulphate and the Dequest 2066A scale inhibitor were measured and placed into the plastic cup. The scale formation process was observed over a period of 24 hours.

Table 3a shows how the concentration of Dequest 2066A affects the resulting mass of the precipitate formed after 24 hours. It was found that scale formation was more easily inhibited when using ammonium sulphate compared to sodium sulphate. Specifically, the amount of the scale inhibitor required to inhibit the reaction of ammonium sulphate with calcium chloride, and the resulting scale formation, is half of the amount of the scale inhibitor required when using sodium sulphate.

An advantage of using ammonium sulphate is that it is more soluble compared with sodium sulphate, meaning that higher concentrations of sulphate can be made available. Concentrated brines can be brought to an offshore site and diluted back with seawater before being injected down a well, reducing the total volume of fluids required to be shipped offshore.

In order to test this approach, the experiment was repeated again, using more concentrated solutions of the scale precursors. The new formulation comprised a 29.3% w/v ammonium sulphate solution and 29.9% w/v calcium chloride solution. Dequest 2066A™ scale inhibitor was provided as a separate solution rather than being included in the sulphate solution.

The concentrates were spiked into water in the following order: scale inhibitor, ammonium sulphate, calcium chloride. In offshore applications, the introduction of the scale inhibitor before the scale precursors is important, as it prevents scaling due to interactions between sulphate ions in the scale precursor solution and the ions already present in seawater. In the first trial the concentrates were spiked into fresh water to monitor the scale formation time without the ion interferences of seawater. In the second trial fresh water was substituted with seawater.

During each trial the relative composition of the final mixture was 1 part concentrate to 2 parts water per solution, meaning 1 part concentrate to 6 parts total volume of the mixture. As a consequence, the concentrations of the scale precursors reduced by a sixth, and that of the scale inhibitor decreased by half, compared with the previous experiments.

Table 3b shows the resulting mass of the precipitate formed after 24 hours, for both trials, that is using fresh water and seawater, the latter with different concentrations of the Dequest 2066A™ scale inhibitor.

It was found that the new formulation using more concentrated scale precursor solutions leads to a substantially the same scale formation time as the initial formulation using the less concentrated solutions, while requiring lower concentrations of the scale inhibitor.

Finally, a core flood experiment was performed to investigate the new formulation in the method of abandoning a zone or a well including the stopping step. The experiment was carried out using the apparatus as in the previous core flood experiments shown in FIG. 4. To simplify the pumping procedure the concentrate solutions were pre-blended such that the volume pumped through pump A (52) comprised 66.0% v/v filtered seawater, 33.4% v/v ammonium sulphate solution and 0.6% v/v pH-modified Dequest 2066A™ scale inhibitor solution, and the volume pumped through pump B (54) comprised 66.6% v/v filtered seawater and 33.4% v/v calcium chloride solution. The fluids were pumped at equal rates through a core sample.

Figure 7:
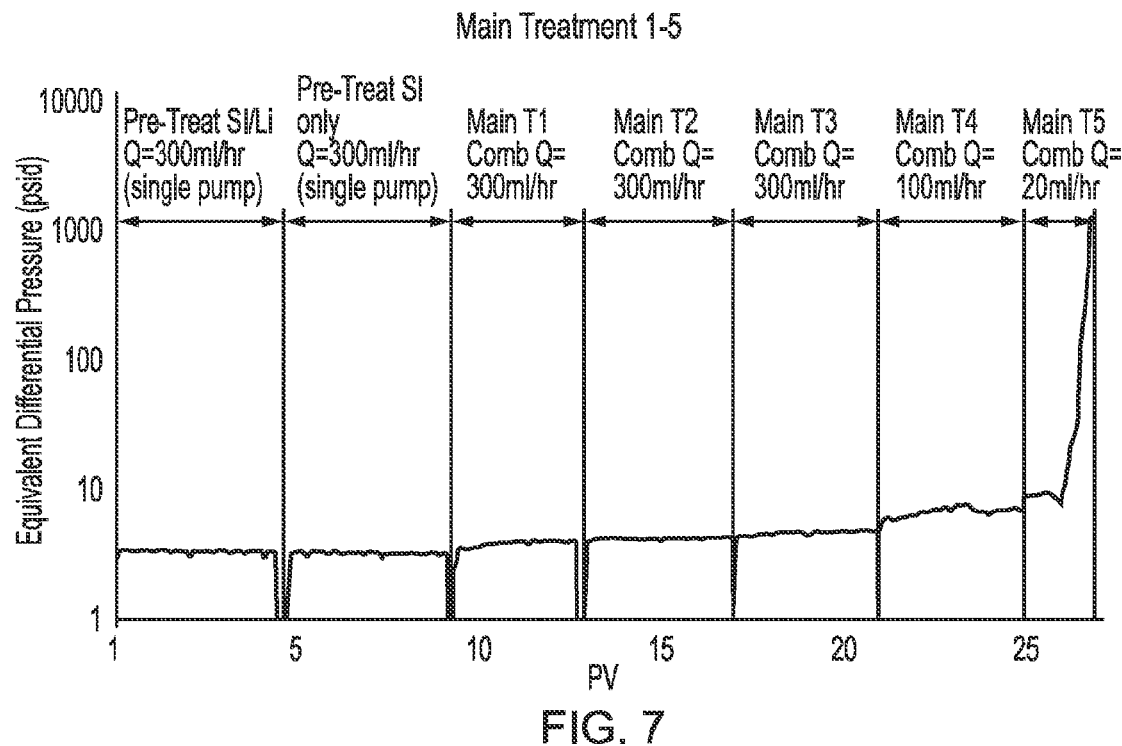
FIG. 7 is a plot of effective differential pressure versus pore volume for a third coreflood experiment.
Figure 8:
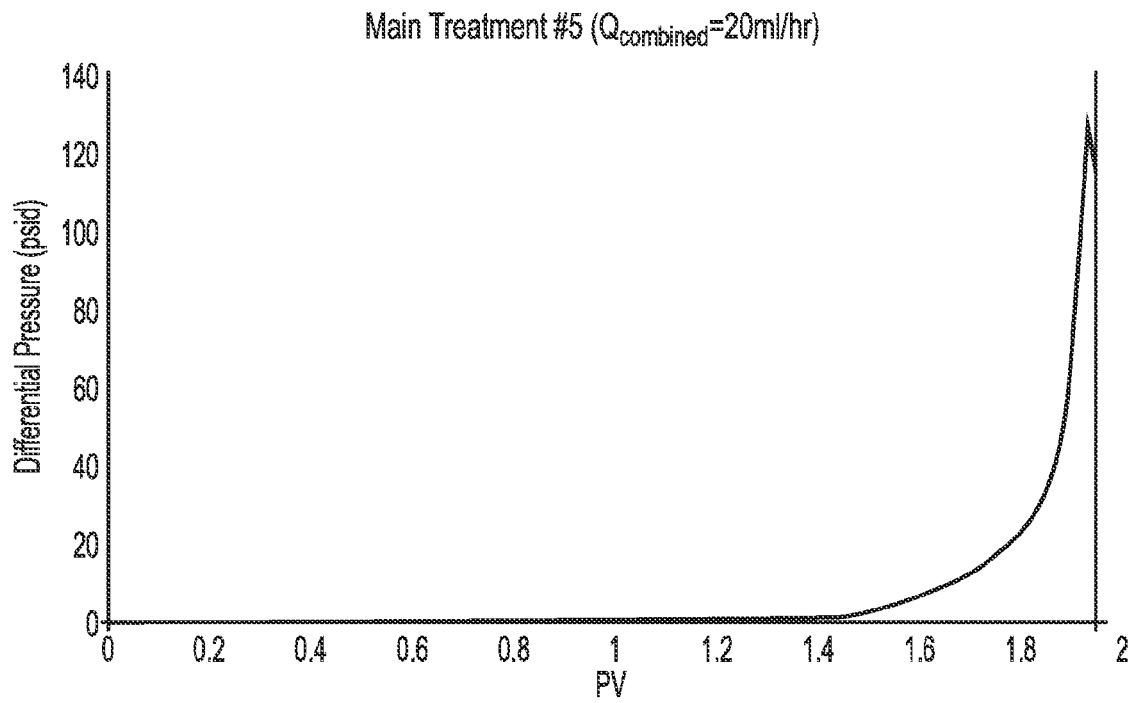
FIG. 8 is a plot of differential pressure versus pore volume for a specific part of the third coreflood experiment.

The pressure differential across the core measured during the experiment is shown in FIGS. 7 and 8. In both figures the pressure is shown as a function of the pore volume of the fluids pumped through the core. One pore volume is defined as the volume of fluid required to fill the pores in the core. For the core used in the experiment one volume corresponded to 18 ml of fluid.

The first two sections in FIG. 7 represent pre-flush stages, therefore it was expected that no increase in pressure would be observed. In the first stage of the main treatment (Main T 1), that is the introduction of the mixture of the scale inhibitor and scale precursors, a slight increase in pressure was observed but not enough to block the core. The pumping was then stopped, the core was shut in to allow the solution to form nucleation sites, and the pumping was restarted. After pumping approximately 4 pore volumes of the mixture, no significant increase in pressure was observed. Consequently, the stopping and restarting steps were repeated until such increase was noted. As shown in FIG. 7, during the fifth repetition of the main treatment (Main T 5) the pressure rose steeply reaching a maximum indicative of the complete blockage of the core.

As the flow rate was gradually reduced over the final two sections of the main treatment (Main T 4 and Main T 5), the y-axis in FIG. 7 shows the equivalent differential pressure instead of the actual differential pressure. As such, the equivalent pressure of 1000 psi corresponds to the actual differential pressure of 120 psi, which was the maximum allowable pressure before the pressure relief valve (58) of the equipment opened.

FIG. 8 shows the actual differential pressure change as a function of the injected pore volume for the final section (Main T 5) only. The initial value of the pore volume is set to 0 PV in order to clearly show at what stage during the final section the core began to block significantly. The steep rise in pressure begins approximately at 1.5 PV as measured from the beginning of the final section.

While in this experiment the scale formation sufficient to fully block the core required five repetitions of the main treatment, this would not be necessary under other conditions (including higher temperature, different pump rates, longer residence times, and/or larger/different volume of rock).

It follows from the above experiments that the new formulation with ammonium sulphate used as one of the scale precursors provides an effective method of abandoning a zone or a well in a reservoir, with comparable scale formation time and reduced amount of scale inhibitor required, even compared with the initial formulation using sodium sulphate. Therefore, the new formulation provides an advantage over the initial formulation for offshore applications as taking concentrated solutions of the scale precursors to site, diluting them back with seawater, adding a scale inhibitor to the diluted brines and mixing in line or just before pumping the fluids into the reservoir is a more practical approach than supplying the mixtures ready to go to the site, owing to the large volumes of fluid required in the latter case. A barrier to flow can therefore be introduced by the simple means of mixing fluids on site and pumping them directly into the reservoir.

An example treatment composition for offshore applications may include 66.3% v/v filtered injection quality seawater, 16.7% v/v ammonium sulphate solution, 16.7% v/v calcium chloride solution and 0.3% v/v pH-modified scale inhibitor solution (shown in bold in Table 3b). The exact dose rates during application of the method of abandoning a zone or a well in a reservoir may vary depending on a range of factors such as, for example, the tubing volume or maximum pump rate. These variables will dictate the length of time it takes for the fluid to reach the reservoir, and therefore how long a delay is required to onset of scaling.

Modifications and improvements can be incorporated herein without departing from the scope of the invention.

The invention claimed is:

1. A method of abandoning a zone in a reservoir, the method comprising the step of introducing to the reservoir, via a well, a mixture comprising a scale inhibitor, a first scale precursor and a second scale precursor, wherein the first and second scale precursors react together to form scale; wherein the first scale precursor comprises ammonium sulphate and the second scale precursor is a soluble inorganic salt of a Group 2 metal.

2. A method of abandoning a zone in a reservoir, the method comprising the steps of:
   (i) introducing into the reservoir, via a well, a mixture comprising a scale inhibitor, a first scale precursor and a second scale precursor, wherein the first scale precursor is a soluble inorganic salt of ammonium, and the second scale precursor is a soluble inorganic salt of a Group 2 metal, and wherein the first and second scale precursors react together to form scale;
   (ii) stopping the introduction into the reservoir of the mixture and shutting in the well for 2-24 hours; and
   (iii) introducing into the reservoir, via a well, a further mixture comprising a scale inhibitor, a first scale precursor and a second scale precursor, wherein the first scale precursor of the further mixture is a soluble inorganic salt of ammonium, and the second scale precursor of the further mixture is a soluble inorganic salt of a Group 2 metal, and wherein the first and second scale precursors of the further mixture react together to form scale.

3. A method as claimed in claim 2, wherein the scale inhibitor, the first scale precursor and the second scale precursor of the mixture are the same as the scale inhibitor, the first scale precursor and the second scale precursor of the further mixture, respectively.

4. A method as claimed in claim 2, wherein the first scale precursor of the mixture and/or the further mixture is ammonium sulphate.

5. A method as claimed in claim 2, further comprising repeating steps (ii) and (iii) at least once.

6. A method as claimed in claim 2, wherein the step (ii) of stopping the introduction into the reservoir of the mixture lasts for from 4 to 12 hours before step (iii).

7. A method as claimed in claim 2, further comprising abandoning the well in the reservoir.

8. A method as claimed in claim 2, further comprising the steps of: spiking a stream of water with the scale inhibitor, the first precursor and the second precursor of the mixture; and introducing the stream of water and mixture into the well together; and/or
   spiking a stream of water with the scale inhibitor, the first precursor and the second precursor of the further mixture; and introducing the stream of water and further mixture into the well together.

9. A method as claimed in claim 8, wherein the water is at least one of sea water, produced water and oilfield brine.

10. A method as claimed in claim 9, wherein the water comprises sea water.

11. A method as claimed in claim 8, wherein the scale inhibitor of the mixture and/or the further mixture is spiked into the stream of water before the first and second scale precursors of the mixture and/or the further mixture.

12. A method as claimed in claim 11, wherein the first scale precursor of the mixture and/or the further mixture is spiked into the stream of water before the second scale precursor of the mixture.

13. A method as claimed in claim 2, wherein the second scale precursor of the mixture and/or the further mixture is selected from the group consisting of a calcium halide or nitrate.

14. A method as claimed in claim 13, wherein the second scale precursor of the mixture and/or the further mixture is calcium chloride.

15. A method as claimed in claim 2, wherein the scale inhibitor of the mixture and/or the further mixture is selected from the group consisting of:
   a carboxylic acid, a carboxylate, an acrylic acid, an acrylate, a phosphonate, a phosphoric acid, a sulfonate, a sulfonic acid, a maleic acid, a maleate, an aspartic acid, an aspartate, a polysaccharide and a polyvinyl, or a derivative, polymer, copolymer thereof, or combinations thereof.

16. A method as claimed in claim 2, wherein the method further includes a pre-treatment step of flushing the well, prior to step (i).

17. A method as claimed in claim 2, wherein the well comprises tubing, and the method further includes a step of displacing the mixture from the tubing, subsequent to step (i) and prior to step (ii).

18. A method as claimed in claim 2, wherein the method further includes the step of at least partially filling the well with cement.

19. A method as claimed in claim 2, wherein the well has perforations therein, and the method further includes the step of at least partially blocking the perforations with a yet further mixture.

20. A method as claimed in claim 19, wherein the further mixture comprises one or more of silicone, a vinyl silicone, a vinyl terminated silicone, polydimethylsiloxane, vinyl polydimethylsiloxane, a fumed silica, a silica flour and a siloxane.

* * * * *

UNITED STATES PATENT AND TRADEMARK OFFICE
CERTIFICATE OF CORRECTION

| | | |
|---|---|---|
| PATENT NO. | : 10,947,441 B2 | Page 1 of 1 |
| APPLICATION NO. | : 16/617112 | |
| DATED | : March 16, 2021 | |
| INVENTOR(S) | : Patrick Joseph Collins et al. | |

It is certified that error appears in the above-identified patent and that said Letters Patent is hereby corrected as shown below:

In the Claims

Claim 15, Column 20, Line 43, please delete "a phosphoric acid" and replace with -- a phosphonic acid --

Signed and Sealed this
Twentieth Day of April, 2021

Drew Hirshfeld
*Performing the Functions and Duties of the
Under Secretary of Commerce for Intellectual Property and
Director of the United States Patent and Trademark Office*